(12) United States Patent
Vaughn et al.

(10) Patent No.: US 10,235,128 B2
(45) Date of Patent: Mar. 19, 2019

(54) CONTEXTUAL SOUND FILTER

(71) Applicant: Intel Corporation, Santa Clara, CA (US)

(72) Inventors: Robert L. Vaughn, Portland, OR (US); James B. Eynard, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/600,078

(22) Filed: May 19, 2017

(65) Prior Publication Data

US 2018/0336000 A1 Nov. 22, 2018

(51) Int. Cl.
| | |
|---|---|
| *G06F 3/16* | (2006.01) |
| *H04R 29/00* | (2006.01) |
| *G10L 25/51* | (2013.01) |
| *G10L 25/78* | (2013.01) |
| *G10L 13/00* | (2006.01) |
| *G06N 99/00* | (2019.01) |
| *G11B 20/10* | (2006.01) |
| *G06F 12/0802* | (2016.01) |

(52) U.S. Cl.
CPC ............ *G06F 3/165* (2013.01); *G06N 99/005* (2013.01); *G10L 13/00* (2013.01); *G10L 25/51* (2013.01); *G10L 25/78* (2013.01); *H04R 29/00* (2013.01); *G06F 12/0802* (2013.01); *G06F 2212/1024* (2013.01); *G06F 2212/1032* (2013.01); *G06F 2212/45* (2013.01); *G11B 2020/1062* (2013.01)

(58) Field of Classification Search
None
See application file for complete search history.

(56) References Cited

U.S. PATENT DOCUMENTS

| | | | | |
|---|---|---|---|---|
| 9,886,954 B1 * | 2/2018 | Meacham | ............... | G10L 15/22 |
| 2011/0166856 A1 * | 7/2011 | Lindahl | .................. | G10L 15/20 |
| | | | | 704/233 |
| 2011/0300806 A1 * | 12/2011 | Lindahl | ............... | G10L 21/0208 |
| | | | | 455/63.1 |
| 2016/0014497 A1 * | 1/2016 | Chizi | ....................... | G08B 3/10 |
| | | | | 381/74 |
| 2016/0086633 A1 * | 3/2016 | Virolainen | ........... | G11B 27/105 |
| | | | | 386/285 |
| 2017/0257072 A1 * | 9/2017 | Mehta | ...................... | H03G 3/32 |

OTHER PUBLICATIONS

Farhad Manjoo, "How does the music-indentifying app Shazam work its magic?", retrieved from slate.com/articles/technology/2009/10/that_tune_named.html, retrieved on Apr. 20, 2017, 5 pages.
David Pierce, "Magical earbuds let you tune in and out of the world around you", retrieved from wired.com/2016/04/doppler-here-review-superhuman-hearing/, retrieved on Apr. 20, 2017, 5 pages.
"Bragi Dash review: The smartest earbuds on the planet", retrieved from engadget.com/2016/01/20/bragi-dash-review/, 4 pages.

* cited by examiner

*Primary Examiner* — Paul Huber
(74) *Attorney, Agent, or Firm* — Jordan IP Law, LLC

(57) ABSTRACT

An embodiments of a contextual sound apparatus may include a sound identifier to identify a sound, a context identifier to identify a context, and an action identifier communicatively coupled to the sound identifier and the context identifier to identify an action based on the identified sound and the identified context. Other embodiments are disclosed and claimed.

19 Claims, 10 Drawing Sheets

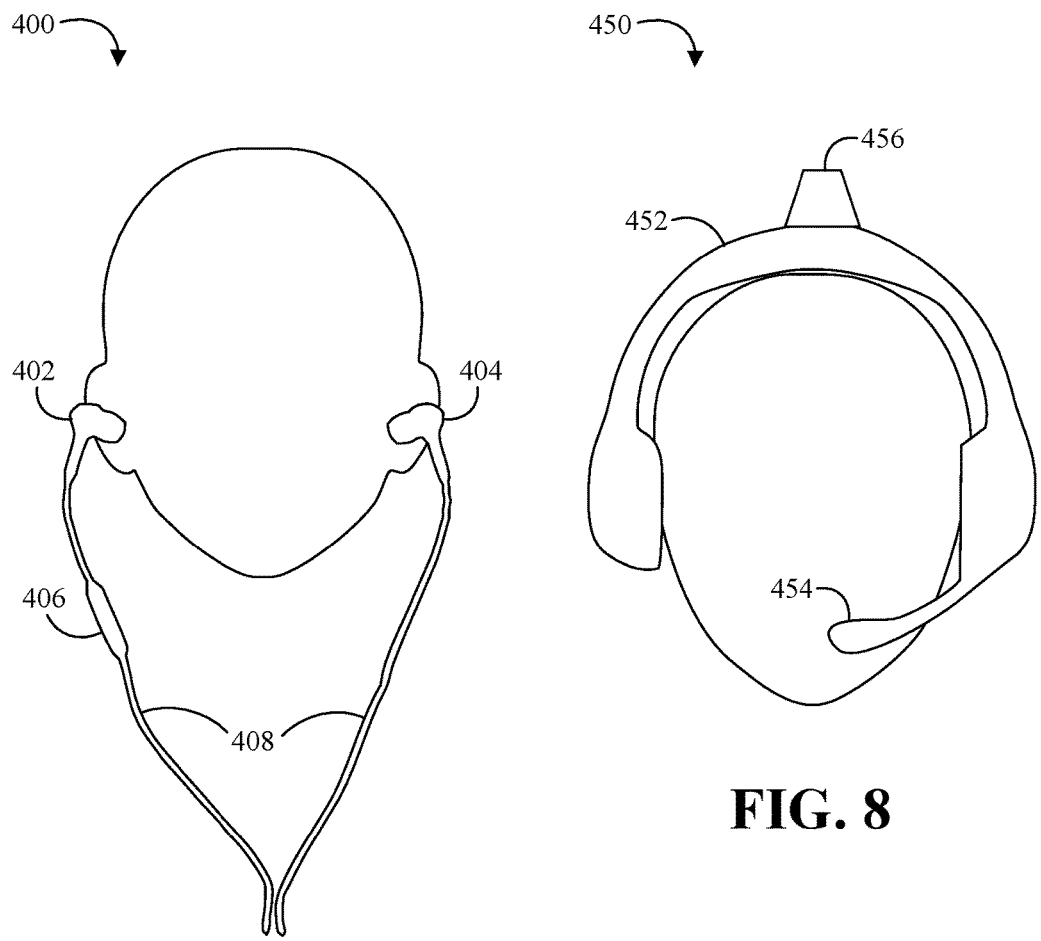
FIG. 7
FIG. 8
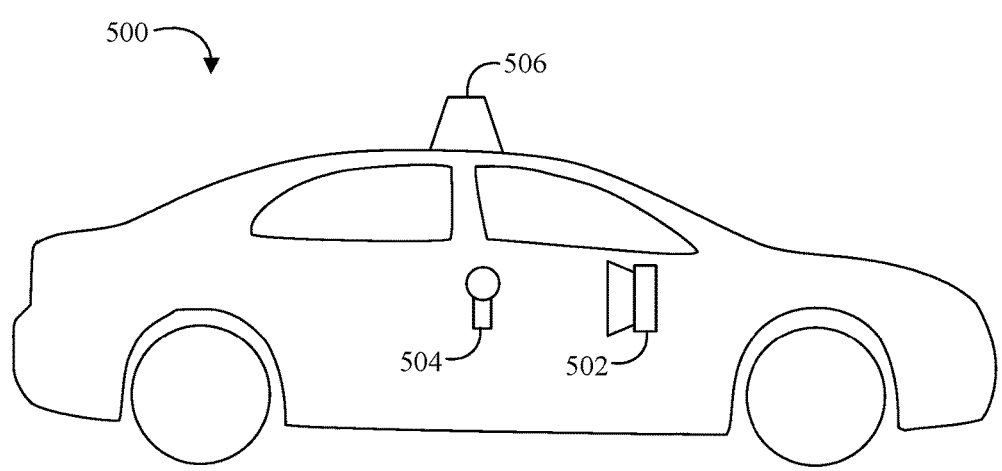
FIG. 9

US 10,235,128 B2

CONTEXTUAL SOUND FILTER

TECHNICAL FIELD

Embodiments generally relate to sound processing. More particularly, embodiments relate to a contextual sound filter.

BACKGROUND

A passive noise cancelling headset may include sound absorbing material to reduce an amount of noise heard by someone wearing the headset. An active noise cancelling headset may include active noise cancellation circuits or filters to reduce an amount of noise heard by someone wearing the headset.

BRIEF DESCRIPTION OF THE DRAWINGS

The various advantages of the embodiments will become apparent to one skilled in the art by reading the following specification and appended claims, and by referencing the following drawings, in which:

FIG. 7 is an illustrative diagram of an example of a headset including a contextual sound system according to an embodiment;

FIG. 8 is an illustrative diagram of another example of a headset including a contextual sound system according to an embodiment;

FIG. 9 is an illustrative diagram of another example of a vehicle including a contextual sound system according to an embodiment;

DESCRIPTION OF EMBODIMENTS

Figure 1:
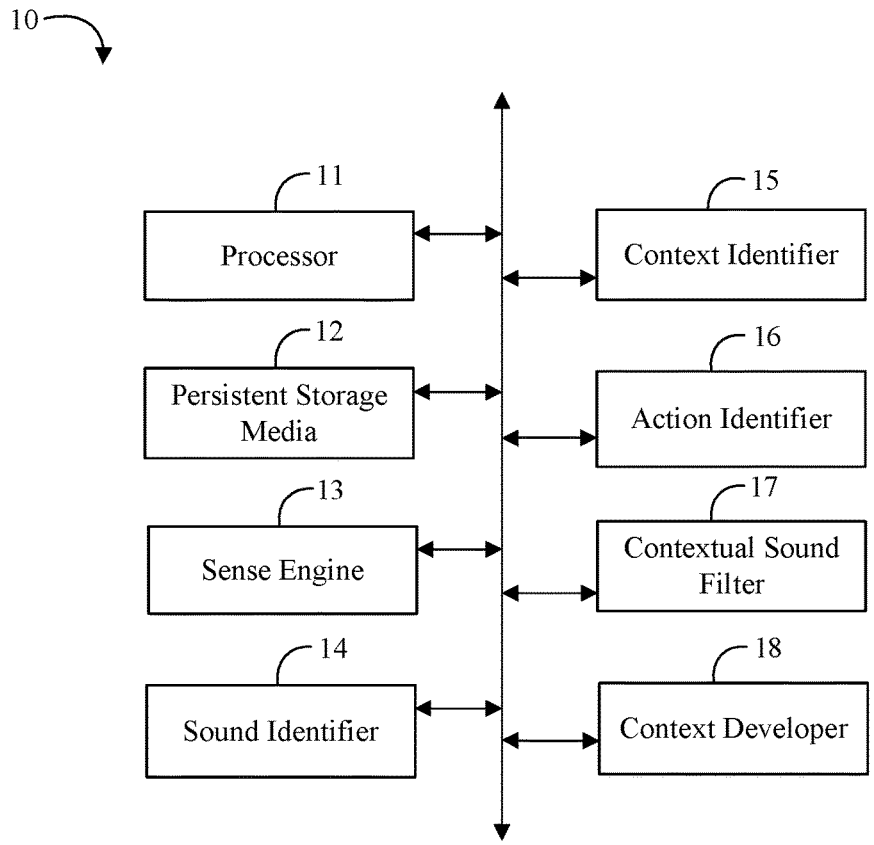
FIG. 1 is a block diagram of an example of an electronic processing system according to an embodiment.

Turning now to FIG. 1, an electronic processing system 10 may include a processor 11, persistent storage media 12 communicatively coupled to the processor 11, a sense engine 13 communicatively coupled to the processor 11 to provide sensed information, a sound identifier 14 communicatively coupled to the sense engine 13 to identify a sound based on the sensed information, a context identifier 15 communicatively coupled to the sense engine 13 to identify a context based on the sensed information, and an action identifier 16 communicatively coupled to the sound identifier 14 and the context identifier 15 to identify an action based on the identified sound and the identified context. In some embodiments, the system 10 may also include a contextual sound filter 17 communicatively coupled to the context identifier 15 and/or the action identifier 16 to filter an audio signal based on one or more of the identified context and the identified action. Some embodiments may further include a context developer 18 communicatively coupled to the sense engine 13 to develop contextual information for the context identifier 15.

In some embodiments, the sound identifier 14 may identify a sound based on an indication of the sound as opposed to an audio waveform. For example, the sense engine 13 may provide a visual indication of a sound. A visual indication may include flashing lights of an approaching emergency vehicle, facial recognition of a nearby person's moving lips, etc. Likewise, the context identifier 15 may provide an indication of a sound. For example, several people in a crowd appearing to respond to a sound or event may provide an indication of a sound.

In some embodiments, the system 10 may also include an output device to provide an output based on the identified action. For example, the output device may include a speaker, a haptic device, a visual output device, a display, etc. For example, the identified action may cause the identified sound to be output to the user as an audio signal through the speaker (e.g., as an isolated sound or mixed with other audio content). The identified action may cause an alternate audible indication such as a reproduction of the identified signal and/or a speech signal (e.g., a synthesized voice saying "Emergency vehicle approaching"). The identified action may additionally, or alternatively, cause a vibration to get the user's attention. The identified action may additionally, or alternatively, cause lights to flash and/or a message to be displayed. Given the benefit of the present specification, numerous other examples will occur to those skilled in the art.

The human voice may be identified as a sound from which action/filtering decisions may be made, although some embodiments are not primarily concerned with speech detection or recognition. Some embodiments are primarily directed to identifying and contextually reacting to non-speech sounds such as artificial sounds, man-made sounds, non-human sounds, etc. To the extent that a voice is identified as a sound, some embodiments may categorize the sound as a voice but may not need to determine what is being said in order to identify an appropriate context-based action. Where speech detection/recognition is utilized, some embodiments may involve further contextual analysis to identify an appropriate action (e.g., as opposed to direct command interpretation based on recognized speech).

Embodiments of each of the above processor 11, persistent storage media 12, sense engine 13, sound identifier 14, context identifier 15, action identifier 16, contextual sound filter 17, context developer 18, and other system components may be implemented in hardware, software, or any suitable combination thereof. For example, hardware implementations may include configurable logic such as, for example, programmable logic arrays (PLAs), field programmable gate array (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the persistent storage media 12 may store a set of instructions which when executed by the processor 11 cause the system 10 to implement one or more components, features, or aspects of the system 10 (e.g., the sense engine 13, the sound identifier 14, the context identifier 15, the action identifier 16, the contextual sound filter 17, context developer 18, etc.).

Figure 2A:
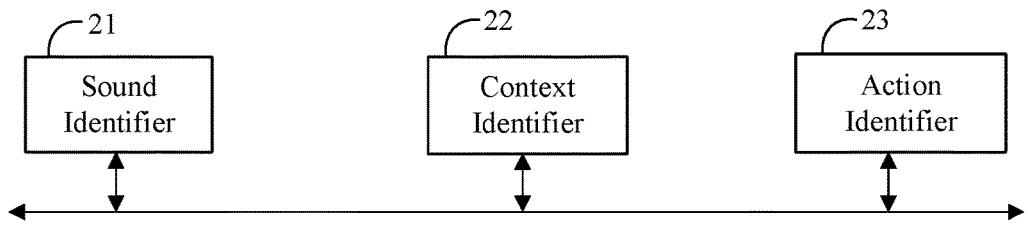
FIGS. 2A to 2C are block diagrams of examples of contextual sound apparatuses according to an embodiment.

Turning now to FIG. 2A, an embodiment of a contextual sound apparatus 20 may include a sound identifier 21 to identify a sound, a context identifier 22 to identify a context, and an action identifier 23 communicatively coupled to the sound identifier 21 and the context identifier 22 to identify an action based on the identified sound and the identified context. In some embodiments, the action identifier may be configured to buffer the identified sound, analyze the buffered sound, and synchronize the buffered sound to real-time based on the analysis and the identified action.

Figure 2B:
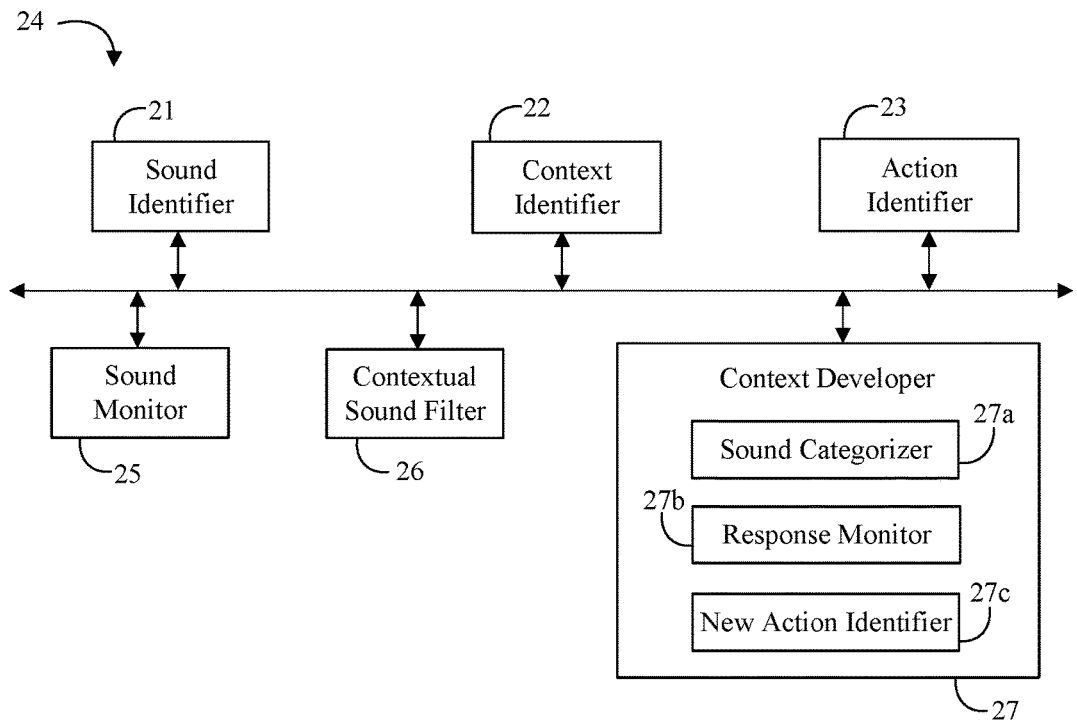

Turning now to FIG. 2B, an embodiment of a contextual sound apparatus 24 may include the sound identifier 21 to identify a sound, the context identifier 22 to identify a context, and the action identifier 23 communicatively coupled to the sound identifier 21 and the context identifier 22 to identify an action based on the identified sound and the identified context, similar to those described in connection with FIG. 2A. The apparatus 24 may further include one or more additional components including, for example, a sound monitor 25 communicatively coupled to the sound identifier 21 to actively listen for one or more sounds, a contextual sound filter 26 communicatively coupled to the context identifier and/or the action identifier 23 to filter an audio signal based on one or more of the identified context and the identified action, and/or a context developer 27 communicatively coupled to the context identifier 22 to develop contextual information for the context identifier 22.

In some embodiments of the apparatus 24, the contextual sound filter 26 may be configured to perform one or more of filter adjustment, filter block, and amplification of the identified sound based on the identified action. In some embodiments, the context developer 27 may include a sound categorizer 27a to categorize an unidentified sound as a newly identified sound, a response monitor 27b to monitor a response to one or more of the identified sound and the newly identified sound, and a new action identifier 27c to identify a new action based on the monitored response.

Figure 2C:
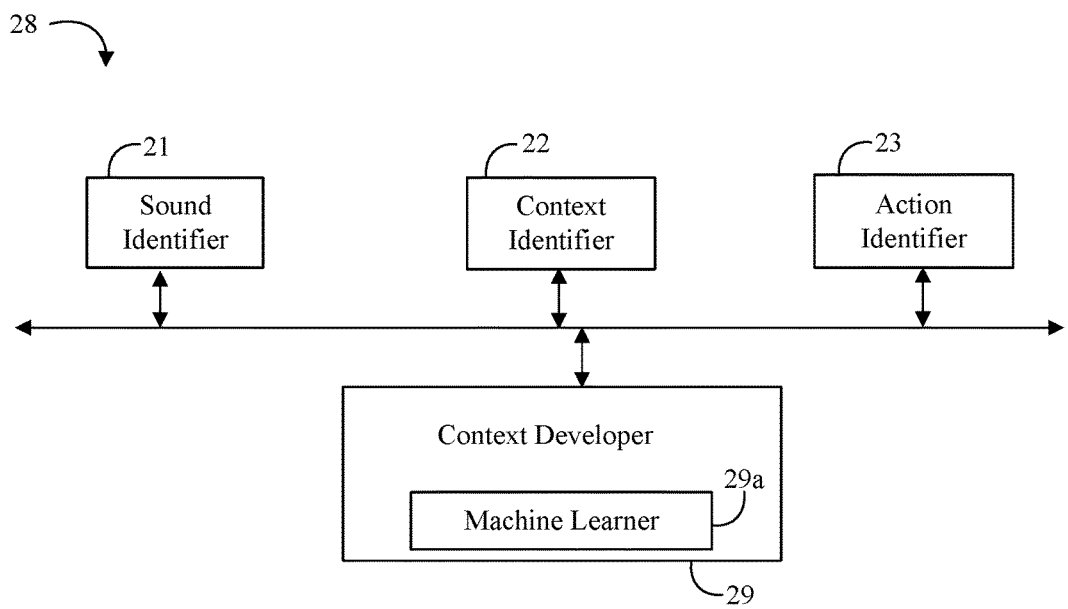
Figure 3A:
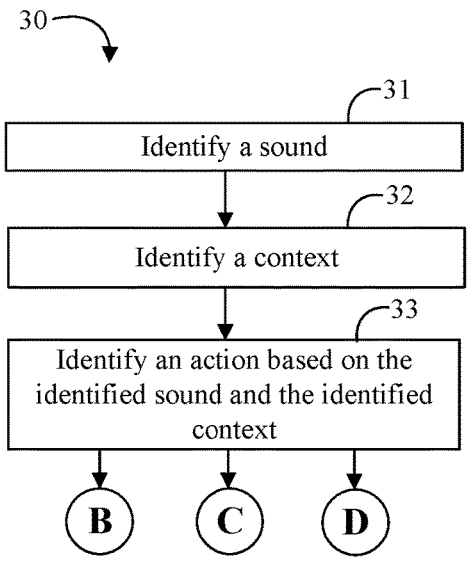
FIGS. 3A to 3D are flowcharts of an example of a method of identifying a sound-based action according to an embodiment.
Figure 3B:
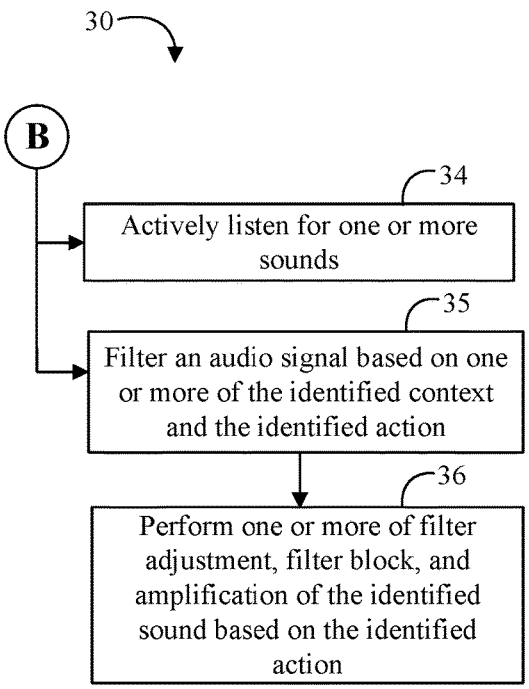
Figure 3C:
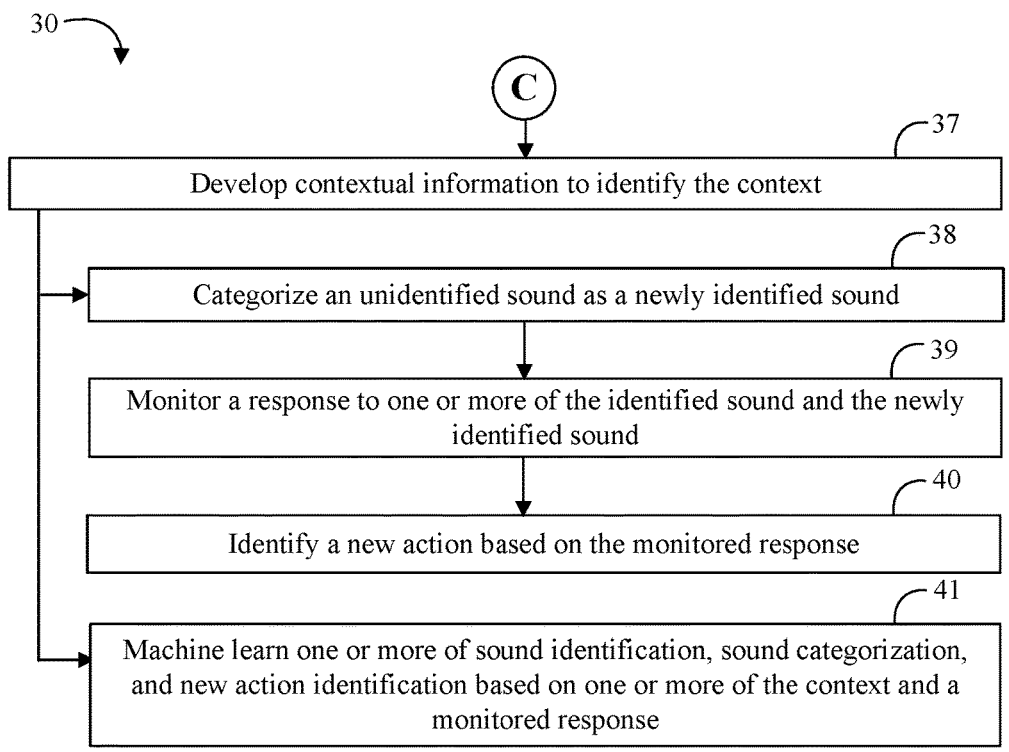
Figure 3D:
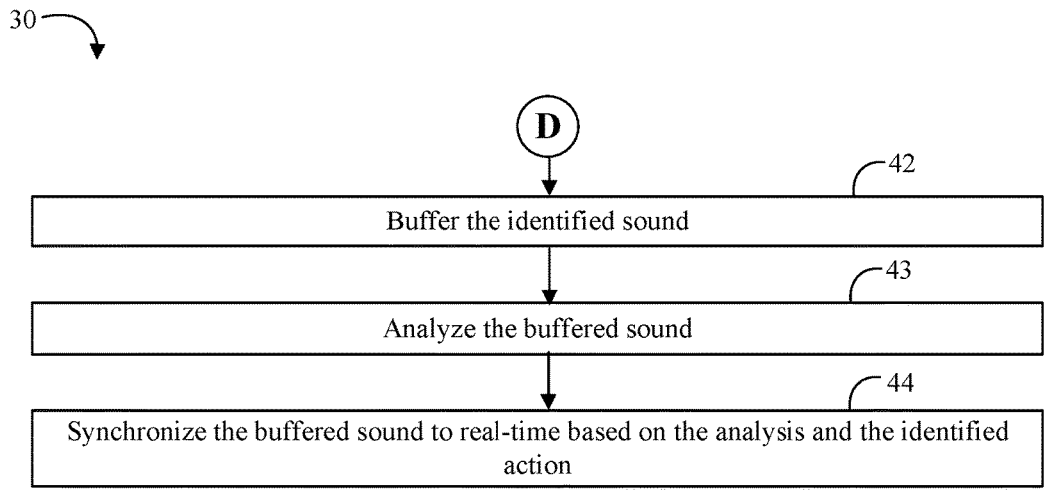

Turning now to FIG. 2C, an embodiment of a contextual sound apparatus 28 may include the sound identifier 21 to identify a sound, the context identifier 22 to identify a context, and the action identifier 23 communicatively coupled to the sound identifier 21 and the context identifier 22 to identify an action based on the identified sound and the identified context, similar to those described in connection with FIG. 2A. The apparatus 28 may further include one or more additional components including, for example, a context developer 29 communicatively coupled to the context identifier 22 to develop contextual information for the context identifier 22. In some embodiments of the apparatus 28, the context developer 29 may additionally or alternatively include a machine learner 29a to one or more of identify a sound, categorize a sound, and identify a new action based on one or more of the identified context and a monitored response (e.g., based on machine learning).

Embodiments of each of the above sound identifier 21, context identifier 22, action identifier 23, sound monitor 25, contextual sound filter 26, context developer 27, sound categorizer 27a, response monitor 27b, new action identifier 27c, context developer 29, machine learner 29a, and other components of the apparatuses 20, 24, and 28 may be implemented in hardware, software, or any combination thereof. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Alternatively, or additionally, these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Turning now to FIGS. 3A to 3D, an embodiment of a method 30 of identifying a sound-based action may include identifying a sound at block 31, identifying a context at block 32, and identifying an action based on the identified sound and the identified context at block 33. The method 30 may further include actively listening for one or more sounds at block 34, and/or filtering an audio signal based on one or more of the identified context and the identified action at block 35. For example, the method 30 may include performing one or more of filter adjustment, filter block, and amplification of the identified sound based on the identified action at block 36.

Some embodiments of the method 30 may further include developing contextual information to identify the context at block 37. For example, the method 30 may include categorizing an unidentified sound as a newly identified sound at block 38, monitoring a response to one or more of the identified sound and the newly identified sound at block 39, and identifying a new action based on the monitored response at block 40. Additionally, or alternatively, some embodiments may include machine learning one or more of sound identification, sound categorization, and new action identification based on one or more of the context and a monitored response at block 41. Some embodiments of the method 30 may also include buffering the identified sound at block 42, analyzing the buffered sound at block 43, and synchronizing the buffered sound to real-time based on the analysis and the identified action at block 44.

Embodiments of the method 30 may be implemented in a system, apparatus, processor, reconfigurable device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages. For example, the method 30 may be implemented on a computer readable medium as described in connection with Examples 20 to 27 below. For example, embodiments or portions of the method 30 may be implemented in applications (e.g., through an application programming interface (API)) or driver software running on an OS.

Sense Engine Examples

An embodiment of a sense engine may get information from sensors, connected devices, content, services, and/or other sources to provide sensed information. The sensed information may include, for example, audio information, image information, motion information, depth information, temperature information, biometric information, CPU/GPU information, IO information, etc. For example, the sense engine may include a sensor hub communicatively coupled to two dimensional (2D) cameras, three dimensional (3D) cameras, depth cameras, gyroscopes, accelerometers, inertial measurement units (IMUs), location services, microphones, microphone arrays, proximity sensors, thermometers, biometric sensors, etc., and/or a combination of multiple sources. The sensor hub may be distributed across multiple devices. The information from the sensor hub may include or be combined with input data from the user's devices.

For example, the user's device(s) may include microphones, cameras, gyroscopes, accelerometers, IMUs, location services, thermometers, biometric sensors, etc. For example, the user may carry a smartphone (e.g., in the user's pocket) and/or may wear a wearable device (e.g., such as a smart watch, an activity monitor, and/or a fitness tracker). The user's device(s) may include one or more microphones which may be utilized to detect sounds, to determine if the user is speaking, on the phone, speaking to another nearby person, etc. The sensor hub may include an interface to some or all of the user's various devices which are capable of capturing information related to the user's actions or activity (e.g., including an input/output (I/O) interface of the user devices which can capture keyboard/mouse/touch activity). The sensor hub may get information directly from the capture devices of the user's devices (e.g., wired or wirelessly) or the sensor hub may be able to integrate information from the devices from a server or a service (e.g., information may be uploaded from a fitness tracker to a cloud service, which the sensor hub may download).

Context Identifier Examples

The context identifier may collect information from a variety of sources to determine contextual information such as an identity of the user, a location of the user, an environment of the user, an activity of the user, an emotional state of the user, and other contextual information. Some contextual information may be derived from the sensor information. Sensed contextual information may include one or more of a noise level of the environment, a brightness of the environment, a temperature of the environment, movement information of the user, biometric information of the user, gesture information of the user, facial information of the user, machine vision information of the user, machine vision information of the environment, etc. Contextual information may also be provided or determined from the user's device such as device temperature, device power, device activity, etc.

The context identifier may also collect, for example, schedule-related information, location-related information for the user, and/or habit-related information for the user. The context identifier may also maintain its own contextual information for the user's schedule/location/activities/etc. Alternatively, or in addition, the context identifier may link to other applications or services to determine context-related information (e.g., cloud services). For example, the schedule information may include time information, date information, calendar information, reminder information, and/or alarm information (e.g., from corresponding applications on the user's computer, apps on the user's smartphone or wearable devices, and/or the user's cloud services)

Some embodiments of the context identifier may leverage the integration of multiple different technologies. One technology may include utilizing machine vision to monitor and/or analyze a user's activity (e.g., machine vision information of the user and/or environment). Another technology may utilize machine learning elements (e.g., of sensed information, of contextual information, of actions/responses, etc.). Another technology may include location integration, including locations within buildings. Another technology may include applying intelligence (e.g., contextual intelligence, artificial intelligence, machine learning, etc.) across the technologies to make contextual determinations (e.g., actions, responses, location, habits, etc.). For example, the contextual information may include contextual information related to at least one other person (e.g., a nearby person, notifications from another user, etc.).

Some embodiments of a machine vision system, for example, may analyze and/or perform feature/object recognition on images captured by a camera. For example, the machine vision system may be able to recognize vehicles such as bicycles, motorcycles, cars, trucks, boats, etc. For example, the machine vision system may also be configured to perform facial recognition, gaze tracking, facial expression recognition, and/or gesture recognition including body-level gestures, arm/leg-level gestures, hand-level gestures, and/or finger-level gestures. The machine vision system may be configured to classify an action of the user. In some embodiments, a suitably configured machine vision system may be able to determine if the user is walking, running, driving, wearing a headset, sitting, standing, and/or otherwise taking some other action or activity.

Information collection may be completely automatic. Alternatively, a user may selectively guide the information collection process. For example, the user may be presented with a screen including check boxes, pull downs, scroll lists, etc. to pick which types of information to collect. For example, the user may selectively disable information collection from particular connected devices, digital personal assistants, and information services. Alternatively, the information collection may include a combination of automatic and manual options.

A contextual information inference engine may analyze the acquired data (e.g., preferably on the cloud) and infer contextual information such as who is currently in the vicinity, what are the characteristics of people in the vicinity (e.g., age, sex, etc.), what events may be occurring in the near future (e.g., cross-referenced with people's scheduled events), and other information retrieved from information services such as the weather, time, etc. Such analysis may occur prior to any sound being identified, and/or an updated analysis for a currently identified sound may be performed based on a change in information or context, periodically, or an update may occur on some other basis. Contextual information inference may be completely automatic. Alternatively, a user may selectively guide the contextual information inference process. For example, a user may be presented with a screen including check boxes, pull downs, scroll lists, etc. to pick which types of information to analyze. Alternatively, the contextual information inference may include a combination of automatic and manual options.

Action Identifier Examples

At a high level, some embodiments of an action identifier may use the sensed information and the contextual information to take some action such as modifying settings and/or parameters for an audio subsystem. The action identifier may store one or more actions in association with saved sensed information and saved contextual information, compare the sensed information from the sense engine with the saved sensed information, compare the contextual information from the context identifier with the saved contextual information, and retrieve a stored action associated with the saved sensed and contextual information based on the comparison. For example, at a detailed configuration level, the modified settings may include specific parameters customized for the user (e.g., a user who is less sensitive to high frequency sounds may have parameters passed to the audio subsystem to boost the amplification of those frequencies).

In some embodiments, the action identifier may incorporate machine learning elements such as an action identification decision network (e.g., produced by ML training). For example, the action identifier may apply the contextual information and/or identified sound to the action identification decision network to output an identified action. In some embodiments, the action identifier may include a combination of stored actions and actions identified by the action identification decision network with logic to select between multiple identified actions.

In some embodiments, a machine learning system may learn the patterns of the user and the action identifier may identify actions based on the user's patterns or preferences. Some embodiments of the machine learning system, for example, may receive information from various sources to learn the user's preferences, habits, and other information which may be useful in identifying actions. For example, the user may wear a headset at about the same time every day. The machine learning system may receive or monitor information related to the activity (e.g., time, duration, noise level, etc.) and may learn from that information that the activity appears to be a habit of the user.

Some embodiments of the machine learning system may also learn location-related information. For example, the machine learning system may integrate a map of the user's residence or workplace. Even without a map or location service (e.g., a global satellite position (GPS) service), the machine learning system may keep track of locations to learn useful information for the action identifier to identify actions.

Contextual Sound Filter Examples

Embodiments of a contextual sound filter may receive the identified sound and/or contextual information directly and make adjustments based on that information (e.g., for various settings) and/or may receive action requests and perform the actions to make adjustments of specific parameters or settings. For example, if the identified action is to block a filter, the contextual sound filter make disable that filter in response to the identified action. In some embodiments, the contextual sound filter may make further decisions based on other information available to the contextual sound filter to defer or ignore the identified action (e.g., a request to block a filter may be ignored or modified if the noise level is determined to be dangerous). In some embodiments, portions of the contextual sound filter may be integrated with or tightly coupled to the action identifier to adjust various filter parameters.

Response Monitor Examples

The action identifier may be also able to use the determinations of a response monitor to make better action identifications. One technology may include utilizing machine vision to monitor a user's activity. Another technology may utilize machine learning elements to learn the user's preferred actions in response to different sounds. For example, a machine vision system may monitor the user's action or response following an identified action to determine what the user did in response to the action. If the user didn't like the action (e.g., as indicated by the user changing the audio settings back or to some other settings), the action identifier may identify a different action in a similar situation in the future.

Devices from the sensor hub may additionally or alternatively be used to monitor the user. For example, the response monitor may analyze connected device activity which may be indicative of a user response. If the user re-adjusts system volumes or re-applies noise filters in response to an action based on an identified sound, for example, the action identifier may adjust the identified action associated with that identified sound/context. The response monitor may also get information from vehicle computers which may be indicative of a user response to a particular sound/context (e.g., audio system volume reduction, reduced speed, lane shift, braking, etc.).

Machine Learning Engine Examples

Some embodiments of a contextual sound apparatus may include a sense engine and a machine learning engine communicatively coupled to the sense engine to provide one or more of sound information, context information, and/or action information based on the sensed information. For example, the sensed information may include one or more of audio information, environmental information, location information, image information, motion information, head motion information, eye motion information, pupil image information, biometric information, audio subsystem information, etc. For example, the machine learning engine may be configured to identify a sound, to categorize a sound, to identify a context, and/or to identify an action based on the identified sound and context. Some embodiments may further include an inference engine communicatively coupled to the machine learning engine to provide the sound/context/action information and/or to identify the sound/context/action. For example, the machine learning engine may be provided from the result of a machine learning (ML) preparation/training for a particular sensor set and/or audio environment. For example, the ML engine may be integrated with or provide information to any of the various components/modules described herein to augment/improve the information and/or identification from those modules (e.g., particularly the action identification).

Advantageously, some embodiments may provide a ML-based action identifier. For example, some embodiments may use all available sensors in a system (e.g., not just the microphones) and ML to drive a better action identification scheme. Some embodiments may use more human interaction sensors. For example, eye tracking may determine if the user is looking right while a motion accelerometer is indicating a particular angle. Using the additional information may provide a better identification of an action based on an identified sound and context. Heart rate, electroencephalography (EEG), body temperature, or other biometrics may also provide useful information for some action identification. Facial recognition with a forward camera may identify a user's expression or muscle tension that habitually precedes a certain action by the user. In some embodiments, a directional microphone or microphone array may receive sound information and determine a direction or location of the sound. If the sound is coming from the left, the user may turn left towards the sound. The user's smartphone, other device(s), or host device may include sensors or useful information to pass along.

A problem with taking data from a multitude of sensors is that it may be difficult to make a good decision about what to do with all the data to identify an appropriate action. Some calculations/predictions may be straightforward, but may not always be the most accurate or appropriate. Advantageously, some embodiments may use machine learning to take the multitude of physical data as an input to produce a function which can identify a more appropriate action. In accordance with some embodiments, one benefit with applying machine learning to identify the action is that a variety of sensors may be used without designing the sensors for this specific purpose. The system may provide as much information as might be available to prepare/train the ML and the output model may decide what is best for a particular situation. The data to the ML preparation/training may be unfiltered.

The sense engine and/or sensor hub may be very expansive including, for example, sensors in a headset, external sensors, etc. The sensor data and other data (e.g., CPU/GPU data, context, biometric data, etc.) may be provided to a ML unit to prepare/train the ML unit, and the result of the ML unit may be used to identify an action. The input data may also include the current audio data that the audio subsystem may provide to the ML.

In some embodiments, the ML may include a deep learning unit. The ML may also include a neural network which gets trained and provides a decision tree. Other examples of a suitable ML include decision tree learning, association rule learning, inductive logic programming, support vector machines, clustering, Bayesian networks, reinforcement learning, representation learning, similarity and metric learning, rule-based machine learning, transfer learning, and/or learning classifier systems. Any type of ML may produce an ML result (e.g., an output function, model, decision tree, etc.) which may improve the identification of a sound/context/action in accordance with some embodiments.

The ML result may be the result of a one-time preparation/training of the ML for a given sensor set and processing environment. In some embodiments, a continuous/regular improvement of the ML result may be provided by regular re-training or updating the ML for a new ML result on a regular or continuous basis (e.g., based on comparison of the predictions to actual information, based on changes in the processing environment, based on changes on the sensor set, etc.). Some embodiments may leverage the availability of an inference engine which may be included with many devices. For example, some electronic systems may include an inference engine. If an inference engine is available, the ML result may act as a classifier and the inference engine may be used to identify the sound/context/action. Some inference engines may be able to update the learning states (e.g., compare an identified action against a user selected action to improve future decision making) during the use or deployment stage.

In general, preparing a ML result may be time-consuming and interactive or regular re-training may not be practical. Some embodiments, may prepare the ML with a particular set of sensors to get a ML result which may run on a particular inference engine without real time updates. In some embodiments, the sensor set may change dynamically. For example, smartphone data may be available initially but then the smartphone may be turned off or run out of battery power so those sensors are not available. In another example, an automobile environment may include an abundance of additional sensor data that is only available in that environment. The process for preparing the machine learning action identifier may generally be to train/prepare the ML with the new sensor set to get a new ML result for the ML sound/context/action identifier, deploy the ML sound/context/action identifier, and then run the ML sound/context/action identifier with the new sensor set. In some embodiments, the training may not be performed in real-time. In some embodiments, the ML result may be pre-trained and just deployed where compatible. For example, a vendor may provide a classifier for its applications on different devices, with different sensor sets, and/or may custom train and make the custom result available to the user (e.g., by download). Some embodiments of a ML engine may aggregate information or data to improve results for sound/context/action identification (e.g., crowd source the information).

Some embodiments may train with a larger sensor set with various sensors unavailable during the training so that the ML result can deal with the limited sensor set. Several classifiers may also be pre-trained for common combinations (e.g., different types of user devices that may be brought into the environment). For example, the ML may train with L microphones, N accelerometer inputs, M camera inputs, etc. During the training, data sets may be run with varying numbers of the sensors available.

Engine/Component Overlap Examples

Those skilled in the art will appreciate that aspects of various engines/identifiers/monitors/etc. described herein may overlap with other engines/identifiers/monitors/etc. and that portions of each may be implemented or distributed throughout various portions of an electronic processing system. For example, the ML engine may use context information to provide an action identification and the context identifier may use machine-learned information to identify the context. Context information may come directly from the sense engine, may be determined/predicted by the ML engine, and/or may be determined/predicted by the context identifier. The examples herein should be considered as illustrative and not limiting in terms of specific implementations.

Advantageously, some embodiments may provide selective sound filtering. For example, some embodiments may enable a system (e.g., a headset, an automobile, etc.) to react to sounds and/or to learn how to react to sounds. In accordance with some embodiments, a reaction may include any number of initiated processes such as turning off sound blocking (e.g., to hear an identified sound of an analog alarm warning blaring in a factory), amplifying a sound (e.g., to hear an identified sound of an emergency vehicle approaching), causing a vehicle to slow down (e.g., based on identifying a sound screeching tires from an impending accident), etc.

Noise cancellation may be considered active or passive. For active noise cancellation, electronics may be used to modify sound waves. For passive noise cancellation, sound absorbing materials may be used to attenuate sound waves. Some other noise cancelling techniques, other active noise cancellation in particular, may work in a reactive, non-intelligent mode that makes it difficult to perform their intended function. For example, a problem with both active and passive noise cancellation is the risk of over-filtering (e.g., preventing the user from hearing a sound that they should hear).

Some noise cancellation headsets may also make use of secondary communication systems that can receive messages (like alarms, or cell phone communication, or two-way radio systems). A problem with relying on the secondary communication system is that not everyone in the environment may have a compatible headset, some useful sound information may not be able to be broadcast over the centralized system, a headset may be out of signal range or may otherwise not receive the signal, and/or the context at each headset may be different.

Advantageously, some embodiments may build upon passive and active noise cancellation techniques to provide active noise cancellation based on contextual predictions and/or determinations. For example, some embodiments may determine if a local noise should be cancelled or not (e.g., logically filtered at a speaker). Some embodiments may determine if a locally broadcast noise should be blocked. (e.g., logically filtered at a microphone). Some embodiments may utilize ML to identify, categorize, and/or act on noises. Some embodiments may require little or no setup or configuration on the user's part. Some embodiments may also establish a reasonable level of security to prevent unauthorized influence or tampering of chimes, notifications, etc. Some embodiments may learn based on user behavior and context. For example, some alarms are more serious than others. Some embodiments may be integrated with the human reaction to the alarm by monitoring the user reaction to determine if the worker is responding to the alarm.

Some embodiments may isolate and identify a sound waveform. From the identification of the waveform it may be possible to reference a library of sounds. The identification may be an exact identification of the waveform, or may be a type or category of the waveform. With the waveform identified, some embodiments may then leverage ML to enabling a variety of use cases. For example, some embodiments may make use of predictive noise filtering based on context. For example, some embodiments may predict what sounds the system may need to filter and then filter just those sounds. Where a user is wearing an active/passive sound filtration headset, for example, the system may unblock sounds (e.g., like alarms or human voices) that the user should hear. With machine learning, some embodiments may also be adapted to accept contextual input from a variety of digital and analog systems.

Figure 4:
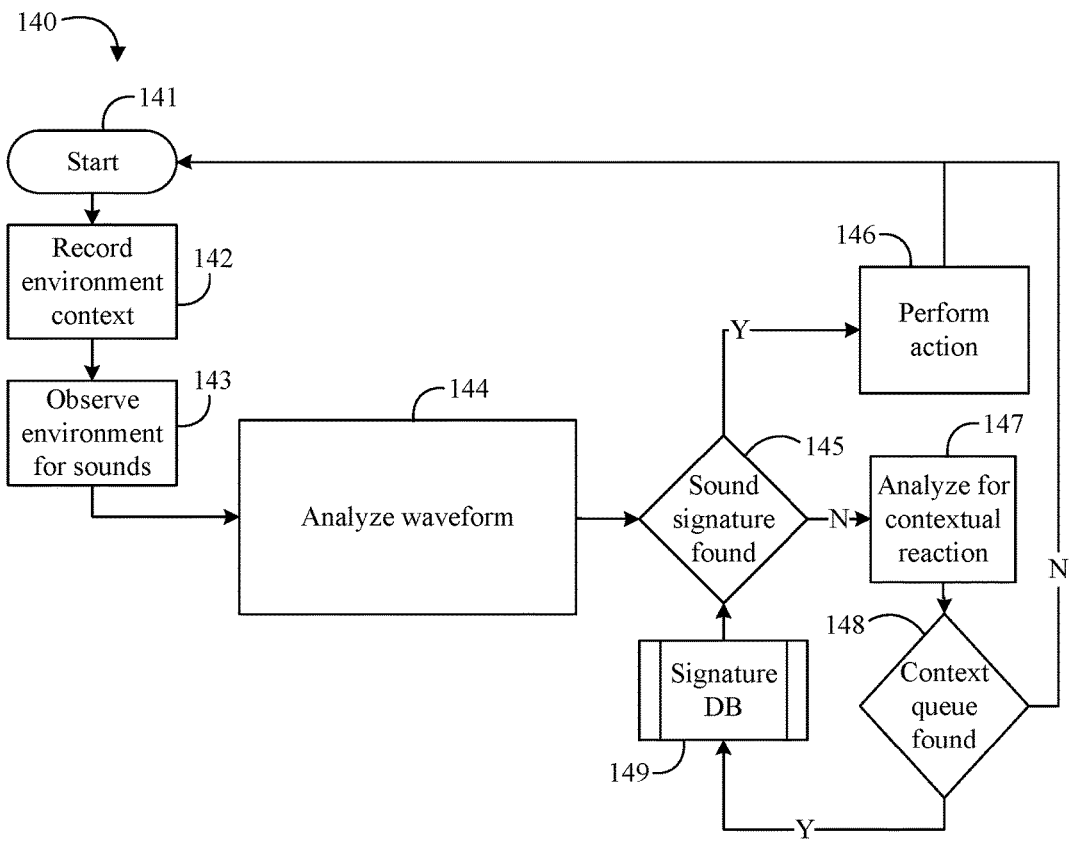
FIG. 4 is a flowchart of another example of a method of identifying a sound-based action according to an embodiment.

Turning now to FIG. 4, an embodiment of a method 140 of identifying a sound-based action may start at block 141. An environmental context may be recorded at block 142 and the sounds in the environment may be observed at block 143. Waveforms of the sounds may be analyzed at block 144 and the method 140 may determine if a sound signature of the waveform is found in a sound signature database at block 145. If the sound signature is found at block 145, an action associated with the sound signature may be performed at block 146 and the method 140 may then repeat from block 141. If the sound signature is not found at block 145, the method 140 may analyze a contextual reaction to the sound signature at block 147. If a context queue is found at block 148, the sound signature may be added to the sound signature database at block 149 together with an identified context-based action (which may then cause the sound signature to be found at block 145). If the context queue is not found at block 148, the method 140 may repeat beginning at block 141.

Some embodiments of a contextual sound system may acquire sound from one or more microphones, isolate individual sounds from a polyphonic source (e.g., by de-mixing, channel stripping, etc.), and match the isolated sounds to a library (e.g., per isolated sound). If the isolated sound is found in the library, the contextual sound system may determine the context and perform an action based on the identified sound and the identified context. If the sound is not found in the library, the system may perform any of contextual logging of the current context, storing the sound in the library, observing the response of the user to the sound, storing an action associated with the sound, etc. (e.g., based on machine learning).

In some embodiments, one or more databases (DBs) may be provided for sound identification, context identification, and/or action identification. Such DBs may be either local or remote (e.g., cloud-based). A sound signature DB may include attributes such as, for example, waveform, common names of waveform, frequency, length, iterations, location type tags, etc. A context DB may include historical context for the user including, for example, location, location type, proximal identity and security identification (IDSID), duration, etc. An action DB may include logic or algorithms to determine correct behavior.

Figure 5:
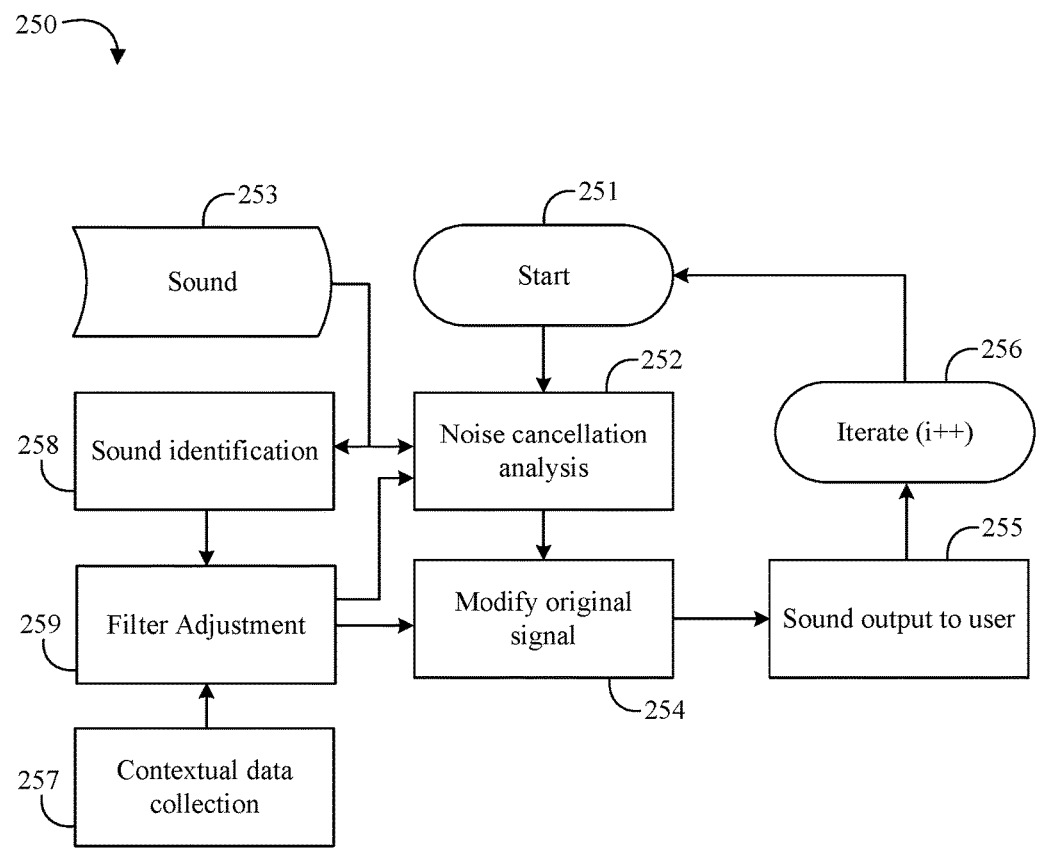
FIG. 5 is a flowchart of another example of a method of identifying a sound-based action according to an embodiment.

Turning now to FIG. 5, an embodiment of a method 250 of identifying a sound-based action may integrate with active noise cancellation. Starting at block 251, noise cancellation analysis 252 may be performed on a sound signal 253. Based on the results of the analysis, the original sound signal may be modified at block 254 and the modified sound may be output to the user at block 255. An iteration may be initiated at block 256, returning to block 251. The active noise cancellation represented by blocks 251 through block 256 may be implemented by any useful active noise cancellation or filter technology. Advantageously, some embodiments of the method 250 may further include contextual sound filter features. For example, the method 250 may include contextual data collection at block 257 and sound identification of the sound signal 253 at block 258. At block 259, based on the context and the sound identification, the method 250 may adjust either or both of the noise cancellation analysis at block 252 and/or the signal modification at block 254.

Non-limiting examples of suitable noise cancellation technology may include noise cancelling using waveform inversion, linear prediction analysis (LPA), waveform cancellation, waveform extrapolation to cancel out a waveform. For example, some active noise cancellation systems may use an inverted phase (antiphase) sound wave of the same amplitude of a noise waveform the system is cancelling. With LPA, the system may attempt to predict the poles in the intensity across the frequency. However, in some cases the prediction may make use of identifying a repeating waveform and perform a simple prediction on the extension of that waveform in time. The particular type of noise cancellation technology utilized is not critical to some embodiments.

Similarly, any useful sound identification or recognition technology may be used to identify sounds in the sound signal. Non-limiting examples of suitable sound identification technology may include waveform analysis, spectrographic analysis, frequency analysis, frequency isolation, amplitude analysis, peak intensity analysis, etc. For example, sound signatures of known or previously identified waveforms may be digitized and stored in a library or database. Captured sounds may be digitized and segmented into snippets to be compared against the stored sound signatures. For some sound signatures, frequency range filters or notch filters may be applied to isolate the sound signature. The particular type of sound identification technology utilized is not critical to some embodiments.

Figure 6:
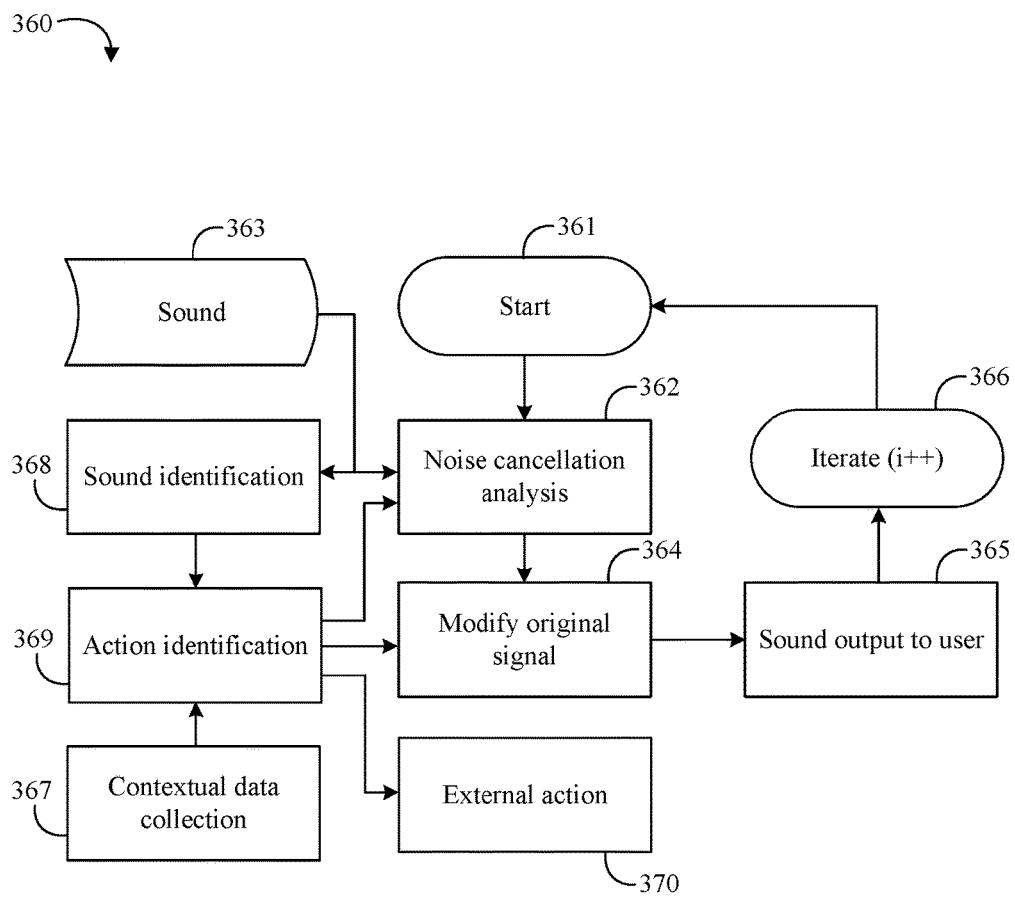
FIG. 6 is a flowchart of another example of a method of identifying a sound-based action according to an embodiment.

Turning now to FIG. 6, an embodiment of a method 360 of identifying a sound-based action may also integrate with active noise cancellation. Starting at block 361, noise cancellation analysis 362 may be performed on a sound signal 363. Based on the results of the analysis, the original sound signal may be modified at block 364 and the modified sound may be output to the user at block 365. An iteration may be initiated at block 366, returning to block 361. The active noise cancellation represented by blocks 361 through block 366 may be implemented by any useful active noise cancellation or filter technology. Advantageously, some embodiments of the method 360 may further include contextual sound reaction features. For example, the method 360 may include contextual data collection at block 367 and sound identification of the sound signal 363 at block 368. At block 369, based on the context and the sound identification, the method 360 may identify an action to perform including one or more of adjustment of the noise cancellation analysis at block 362, adjustment of the signal modification at block 364, and/or performing some other action at block 370.

Turning now to FIG. 7, a contextual sound system 400 may include one or more earbuds 402, 404 and at least one microphone 406. The microphone 406 is illustrated as spaced from the earbuds 402, 404 but may in some embodiments be integrated with the earbud 402 or 404 (e.g., or a microphone may be integrated with each earbud 402 and 404). In some embodiments, contextual sound features may be integrated together with active noise cancellation circuits or filters on a same integrated circuit which is small enough to be housed within the housing of the earbuds 402, 404. The system 400 is illustrated with cords 408, but some embodiments of the system 400 may be wireless (e.g., and cordless). Each of the earbuds 402, 404 may include one or more electroacoustic transducers or speakers to convert an electrical audio signal to a corresponding sound. For either wired or wireless embodiments, features, components, or portions of the contextual sound system 400 may be implemented with or augmented by the user's connected devices (e.g., a smartphone) and/or cloud services. The contextual sound system 400 may include one or more features of any of the embodiments described herein. For example, some embodiments of the contextual sound system 400 may include a sound identifier to identify a sound, a context identifier to identify a context, and an action identifier communicatively coupled to the sound identifier and the context identifier to identify an action based on the identified sound and the identified context.

Turning now to FIG. 8, a contextual sound system 450 may include a headset 452 and at least one microphone 454. The headset 452 may include additional sensors 456 which may include 2D and/or 3D cameras, accelerometers, proximity sensors, additional microphones, etc. In some embodiments, contextual sound features may be integrated together with active noise cancellation circuits or filters on a same die or board which is small enough to be housed within the housing of the headset 452. The headset 452 may include one or more electroacoustic transducers or speakers to convert an electrical audio signal into a corresponding sound. The system 450 may be wired or wireless. For either wired or wireless embodiments, features, components, or portions of the contextual sound system 450 may be implemented with or augmented by the user's connected devices (e.g., a smartphone) and/or cloud services. The contextual sound system 450 may include one or more features of any of the embodiments described herein. For example, some embodiments of the contextual sound system 450 may include a sound identifier to identify a sound, a context identifier to identify a context, and an action identifier communicatively coupled to the sound identifier and the context identifier to identify an action based on the identified sound and the identified context.

Turning now to FIG. 9, a vehicle 500 may include a contextual sound system including an audio subsystem 502 (e.g., including one or more electroacoustic transducers or speakers to convert an electrical audio signal into a corresponding sound) and at least one microphone 504. The vehicle 500 may include additional sensors 506 which may include 2D and/or 3D cameras, accelerometers, proximity sensors, additional microphones, etc. Some of the microphones 504 and/or sensors 506 may be positioned to sense information inside the vehicle 500 while others may be positioned to sense information outside the vehicle 500 (e.g., external facing and/or mounted cameras and/or microphones). In some embodiments, contextual sound features may be integrated together with an onboard computer of the vehicle 500 and housed within the vehicle 500. In some embodiments, features, components, or portions of the contextual sound system may be implemented with or augmented by the user's connected devices (e.g., a smartphone) and/or cloud services. The contextual sound system of the vehicle 500 may include one or more features of any of the embodiments described herein. For example, some embodiments of the contextual sound system of the vehicle 500 may include a sound identifier to identify a sound, a context identifier to identify a context, and an action identifier communicatively coupled to the sound identifier and the context identifier to identify an action based on the identified sound and the identified context.

Figure 10:
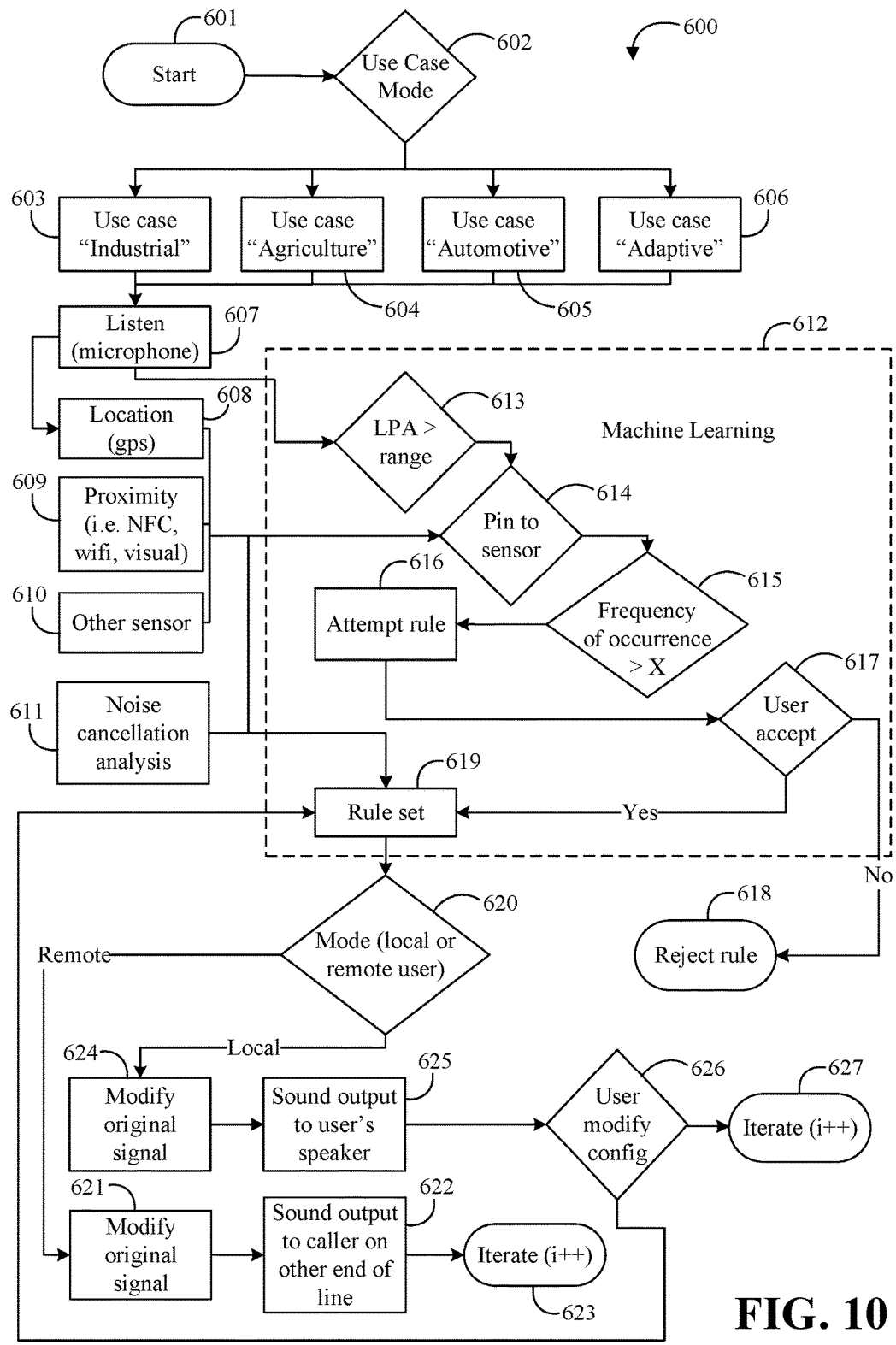
FIG. 10 is a flowchart of another example of a method of identifying a sound-based action according to an embodiment.

Turning now to FIG. 10, an embodiment of a method 600 of identifying a sound-based action may start at block 601. A contextual determination of a use case mode may be made at block 602. For example, based on the context the method 600 may load different sound signatures into a local library, and/or may re-prioritize a search order of the sound signature library for the identified use case mode (e.g., to reduce the latency of identifying sounds most likely to be found in the environment). If the use case is determined to be industrial, for example, sound signatures for an industrial use case mode may loaded or prioritized at block 603. Similarly, respective sound signatures may be loaded/prioritized for an agriculture use case mode at block 604, an automotive use case mode at block 605, an adaptive use case mode at block 606, etc. Numerous other contextual determinations may be made based on location/context, and the particular sound signatures loaded or prioritized may be very specific (e.g., user's home office on Tuesday morning in the summer when the lawn service usually cuts the grass, user's car on interstate I-5 in Montgomery county while mid-day construction is underway, conference room 1201 in building at 123 Main Street, etc.).

After the use case is determined, the method 600 may listen for sounds (e.g., with one or more microphones) at block 607. Additional contextual information may be collected or developed such as location information at block 608, proximity information at block 609, and other sensor information at block 610. The method 600 may also include noise cancellation analysis at block 611. The method 600 may include ML elements 612 to apply and/or learn rule-based actions. In some embodiments of the method, if the LPA is greater than a range at block 613 and the additional context information (e.g., including whether noise cancellation analysis information is pinned to a sensor at block 614), a determination of the frequency of occurrence may be made at block 615. If the frequency of occurrence is greater than X (e.g., a contextual variable) at block 615, the method 600 may attempt to apply a rule at block 616 and make a determination of whether the user accepted the rule at block 617. If the user does not accept the rule at block 617, the rule may be rejected at block 618. If the user accepts the rule at block 617, the method may apply the rule at block 619. For example, the noise cancellation analysis at block 611 may apply an initial rule or set of rules at block 619, and the ML elements 612 may adjust those rules based on contextual or ML determinations.

The method 600 may also provide active noise cancellation elements. After the rule is set at block 619, a determination may be made as to whether the mode is local or remote at block 620. If the mode is determined to be remote at block 620, the original signal may be modified at block 621 (e.g., in accordance with the rule set), the sound may be output to the remote user at block 622, and an iteration may be initiated at block 623 (e.g., returning to block 601). If the mode is determined to be local at block 620, the original signal may be modified at block 624 (e.g., in accordance with the rule set) and the sound may be output to the local user at block 625. For a local user, the method 600 may further monitor the user to determine if the user modified the rules or configuration for the current context at block 626. If the user modifies the rules or configuration at block 626, the method 600 may provide that information to the ML elements 612 to learn the new user selected contextual rules at block 619. Otherwise, an iteration may be initiated at block 627 (e.g., returning to block 601).

In accordance with some embodiments, a worker working in a factory environment may be wearing a headset with a contextual sound system. The system may monitor for repetitive sounds. When a repetitive sound is found, it may be categorized. If the sound is known, then a rule may be enacted. If the sound is new, the system may determine if the sound fits within selected boundaries and, if so, then the system may unblock the sound (e.g., so the user may hear the sound). The user may re-block the sound or otherwise react in a sensor measurable way. The action of the user may be recorded and aggregated across multiple users (e.g., in the vicinity, the workforce, the population, etc.). A ML system may observe and may block the sound to allow the user to hear other sounds (e.g., which may be configurable). A repetitive sound may include a sound from which the use case can define acoustic characteristics such as frequency, amplitude, iteration, etc.

Using a contextual cue, intelligent filtering may advantageously be applied to an active noise cancellation process. For example, some embodiments of the contextual sound system may react to a known noise (e.g., predicted to be present in the environment) and more accurately cancel just those waveforms associated with the offending noise. Additionally, or alternatively, the predicted noise cancellation signature may be applied at either a microphone (e.g., incoming signal processing) to prevent a noise from being transmitted to the headset (e.g., or from being transmitted to another user), or at a speaker (e.g., outgoing signal processing) to prevent the noise from being heard (e.g., at the user's headset or at another user's headset). Embodiments may be useful in a variety of applications including both consumer and industrial (e.g., healthcare, energy, transportation, agriculture, military, etc.).

Some embodiments may be better understood with reference to non-limiting use case examples. Various industrial or factory environments may be subject to pervasive machine noise. For example, an oil rig may be a very noisy and dangerous environment. Machines found at an oil rig may include rotary systems, draw-works, mud injectors, vibrating mudscreens, etc. Most workers in such an environment may wear helmets and ear protection. Such ear protection may be passive and/or active. The industrial machines may include one or more alarms that could be triggered to indicate condition with varying degrees of danger/urgency. It may be difficult to speak to someone in such an environment. Advantageously, some embodiments may be able to recognize sounds in the environment such as an alarm or a person's voice and then perform some sort of action. For example, some embodiments may be able to cancel a sound given its identity or cancel everything but the sound given its identity, depending on the sound and the context. At an oil rig, for example, the system may identify an analog alarm for gas release and turn off active noise filtering in the user's headset so they can hear the alarm. In some embodiments, the system may be configured to buffer the alarm sound, analyze the buffered alarm sound, and synchronize the buffered alarm sound to real-time. For an otherwise passive noise cancelling headset, the system may include a speaker inside the headset. The system may bypass the passive noise cancellation by transmitting the alarm sound to the speaker (e.g., at a safe sound level).

In another use case example, a user may have a headset on or, for example, may be in a vehicle with sound management (e.g., passive or active noise filtering). The contextual sound system may identify an ambulance sound. The contextual sound system may be able to interrupt phone calls, radio, etc. and allow the ambulance sound to be heard. In some embodiments, the system may be configured to buffer the identified ambulance sound, analyze the buffered ambulance sound, and synchronize the buffered ambulance sound to real-time based on the analysis and the identified action. After the ambulance sound is acknowledged by the user, the sound management may return to its prior state (e.g., radio playing at regular volume). The ambulance sound may be acknowledged either explicitly (e.g., touch screen prompt, voice command of "I see it,", etc.) or implicitly (e.g., facial expression recognition, looking in mirror, slowing down, pulling over, etc.).

In another use case example, a driver may be in a vehicle. The contextual sound system may observe a sound with acoustic properties that indicate an out of norm signature. The system may compare the sampled sound to a library and find no match. The system may observe the driver reacting to the sound (e.g., through stand-off sensors such as cameras, INTEL REALSENSE, the vehicle computer, etc. or attached sensors such as the user's BLUETOOTH earpiece). The system may observe that the driver is changing vehicle lane (e.g., or direction) and speed in response to the sound. The system may add the sound to the library (e.g., together with contextual and/or action information) and/or may add the sound to a shared library system (e.g., cloud based). For example, the sound may be associated with the driver giving deference to the sound. On a subsequent observation of the sound, the system may be able to refer to the prior driver behavior and identify an appropriate action such as turning down the radio, adjusting side mirrors to a directional location of sound, etc. In some embodiments, nearby vehicles may also be able to reference the sound mapping and act accordingly.

In another use case example, a passenger may wear noise cancelling headphones in a noisy airplane environment, but the contextual sound system may allow the passenger to hear announcements and/or chime indicators. For example, the system may recognize the context as an airplane interior, load appropriate filters for airplane engine noise, load/prioritize sound signatures for the airplane sound system and chimes, and actively listen for sounds (e.g., while the passenger listens to music). If the system identifies announcements or chimes, the system may reduce the volume of the music and/or may mix the microphone signal into the headphones so the passenger can hear the announcements/chimes. In some embodiments, the system may be configured to buffer the identified sound, analyze the buffered sound, and synchronize the buffered sound to real-time based on the analysis and the identified action. When the system identifies the engines starting, the system may apply the engine noise filters. If the system identifies the further context of the passenger sleeping during the flight, the system may decide to not pass an identified seatbelt chime through to the passenger.

In another use case example, a farm worker may wear a noise blocking headset while driving a tractor. If the context is identified as the tractor being driven in a field, the contextual sound system may allow most sounds to remain blocked. If the context is identified as driving on a road, however, the contextual sound system may pass through sounds such as approaching vehicle noises, horns, sirens, etc. In some embodiments, the corresponding sound may be buffered, analyzed and then re-synchronized to real-time.

In another use case example, a construction worker may be driving a skid loader (e.g., a BOBCAT) and may be wearing a sound cancelling headset which includes an embodiment of a contextual sound system. Another worker may approach the skid loader and holler at the skid loader driver to stop because of a dropped power line. Ordinarily, the driver may not hear that there is a power line danger. Advantageously, the contextual sound system may allow for the other worker's voice to be identified and to pass the voice through the headset so the driver may hear it.

In another use case example, a person may be walking in a parking lot towards their car while on a phone call. As the person approaches their car, opens the door, puts the key in to ignition, etc., several chimes and beeps may sound. Ordinarily, both the driver and the person on the other end of the line may hear all of those chimes and beeps from the car. Advantageously, some embodiments may allow for the car to silence the chimes and/or for the contextual sound system to filter the noise out. However, if the car signaled an important chime indicating a child ran behind the car then the contextual sound system would allow that chime to be heard. In some embodiments, the chime sound may be buffered, analyzed and then re-synchronized to real-time.

In another use case example, a jogger may be wearing ear buds that include an embodiment of contextual sound system. The contextual sound system may identify the context of the jogger in motion (e.g., jogging) and unblock potentially important external sounds for the jogger to hear such as the sound of an approaching vehicle, a car horn, a bicycle bell, backup warning beeps, nearby pedestrians, etc. For example, the contextual sound system may mix the identified sound with the other audio signal in the earbuds, may reduce the volume of the other audio signal, may disable active noise filtering, etc. In some embodiments, the identified sound may be buffered, analyzed and then re-synchronized to real-time. If the jogger stops jogging and is relatively stationary, the contextual sound system may identify that the context changed and identify different actions (e.g., allow the system to block a wider variety of noise that indicate less dangerous situations, not turn the volume down or turn it down less, etc.).

In some embodiments, the car and phone may communicate to exchange sound/context/action information. For example, the car may transmit its intended audio/alarm signature plan to the phone. In some embodiments, the car and the phone may not communicate. The phone may include the contextual sound system to learn from repeated observations and machine learning what the car will do from an expected audio/alarm signature plan. In some embodiments, the car and phone are not necessarily paired. However, the vehicle sound system may emit an ultrasonic sound pattern that may act as a non-aural means of communicating the expected audio/alarm signature plan to the phone.

Some embodiments may also include intelligent filtering. For example, some embodiments may determine when filtering should be turned off to allow the user to hear an alarm (etc.) or to turn on filtering to prevent one from hearing an alarm. For example, industrial alarms may override passive and active filtering. Repeatable alarms/chimes sounding in a meeting room may be filtered (e.g., unless they indicate an emergency). In a bedroom of a house, for example, a contextual calculation may determine when to turn off active filtering if a visitor to the house rings the doorbell at night (e.g., where the contextual sound system may be part of an automated home assistant such as AMAZON ECHO or GOOGLE HOME). In-vehicle entertainment including a contextual sound system in accordance with some embodiments may react better to fire-trucks, ambulances, etc. In some embodiments, sound signatures may be documented, uploaded, downloaded, and shared through crowd or cloud based systems.

Some embodiments may inject noise cancellation based on contextually predicted noises. For example, a contextually predicted noise may have a known acoustic signature that may be broadcast to the user device based on predictions made from context. Advantageously, the user sound system may then have pre-loaded information on the expected noise (e.g., acoustic interference) and may be able to adapt to that interference in a manner more closely aligned to the actual noise characteristics than might be possible from solely reactive sound noise control (e.g., conventional active noise cancellation). For example, food ready alarms are different in MCDONALDS as opposed to TACO BELL. If the context is determined to be a MCDONALDS location, the contextual sound system may pre-load the sound categories and cancellation characteristics for that restaurant in anticipation of the food alarms sounding while in the restaurant. In another example, the ambulance sirens in one county or location may be different from another location, etc. Based on GPS location, for example, the contextual sound system may pre-load sound signatures corresponding to predicted emergency vehicle siren sound signatures.

A variety of data may be available to the contextual sound system to establish relevance from context. Along with location, proximity and others there is, of course, sound. In an industrial setting, some embodiments may advantageously make headsets that are safer for industrial workers. For example, an industrial alarm may have a signature waveform and/or spectrographic analysis of the industrial alarm. The contextual sound system may perform sound analysis to determine the waveform/spectrographic characteristics of an observed waveform in the environment and map that waveform to a library of sounds. If the observed waveform is identified from the library, the contextual sound system may react based on a rule set. For example, the contextual sound system may disable LPA filtering thereby allowing the worker to hear the alarm.

In another example, the context may be a vehicle and the observed waveform may correspond to a seatbelt unfastened indicator. In this case the sound is impacting the driver experience, but the indicator is also a safety indicator. In some cases, a simple binary decision of turn an alarm off or leave an alarm on is insufficient. Some embodiments may build the context from a variety of sources. If the car is not moving, some embodiments may block the seat belt indicator alarm for both the driver and the person on the other end of a call (e.g., a remote listener) to provide for a better user experience. But the contextual sound system may also take safety into consideration such that if the driver places the car in gear or the car starts moving, then the contextual sound system may unblock the sound for the driver.

The contextual sound system may have a reference library of sounds (e.g., including sounds from collected/shared user observations) and may be able to match a wide variety of sounds to a definition/identification. The contextual system may know what the sound means and may be able to intelligently react to the sound based on the context. For example, some embodiments may start with default rules populated from a variety of sources including machine learning. An example rule might have the following structure: if ((usr avg iterations<2) && (location=parking lot)) then {silence alarm( )}. Additionally, some embodiments may be architected to identify pre-alarms or short sounds that could indicate that an audible alarm was going to start, and to disabling active sound filtering in response to the pre-alarm.

Some embodiments of a contextual sound system may identify a sound from ambient sources or from a secondary communication channel (e.g., notification of a sound broadcast via WIFI, HTTP, streaming, etc). Whether a person is a factory worker with a headset or a person driving a car, the contextual sound system may be able to identify known sounds, learn appropriate actions for unknown sounds, and either filter, amplify or perform appropriate actions (e.g., if X then Y, else Z actions). The contextual sound system may actively listen. Where the system is able to identify a sound that is in its library then it may perform an action. That action may either be configurable (e.g., if (sound=police car siren) then {action=turn down stereo speakers}) or learned (e.g., observe environmental context>>is user/environment reacting to sound?>> document action).

Some embodiments may advantageously act as a proxy for the disposition of sounds entering a system. In some cases, there may be a lag between detection of a sound and identifying an appropriate action (e.g., ranging from a few milliseconds to a few seconds). For example, some embodiments may include a local sense engine to capture sounds but may rely on networks and/or cloud services for one or more of the sound identification, the context identification, and/or the action identification. Less lag is obviously more desirable. Given the persistent nature of some alarms (and the potential danger associated with the alarm), however, as compared to the user never hearing the alarm a few second delay is still highly advantageous and some embodiments may potentially be life-saving even with some processing lag.

In some embodiments, some sounds (e.g., a human voice) may be identified in near real-time and any associated latency (i.e. buffering) may be minimal to the point of not being perceptible. However, in some cases a sound sampling may be buffered (or stored) for a long enough duration to perform an analysis. If the analysis suggests that an action needs to take place such as "the user needs to hear this sound" then the system may replay the sound at a delay. In some embodiments, once the sound is identified (and where the sound is buffered) the sound may be played back at a higher or accelerated rate to re-synchronize (e.g., catch-up) with the sound that is still occurring. A library of sound types (e.g., human voice, alarm, etc.) with corresponding acceleration rates may be leveraged as an input on how the system may execute a re-synchronization to real-time. In some cases, the system may decide that playing a delayed version of the sound is sufficient without re-synchronization to real-time. Similarly, in some cases where the sound is repetitive and ongoing, the system may decide that the sound does not need to be replayed at all and passing the ongoing sound through to the user is sufficient.

Figure 11:
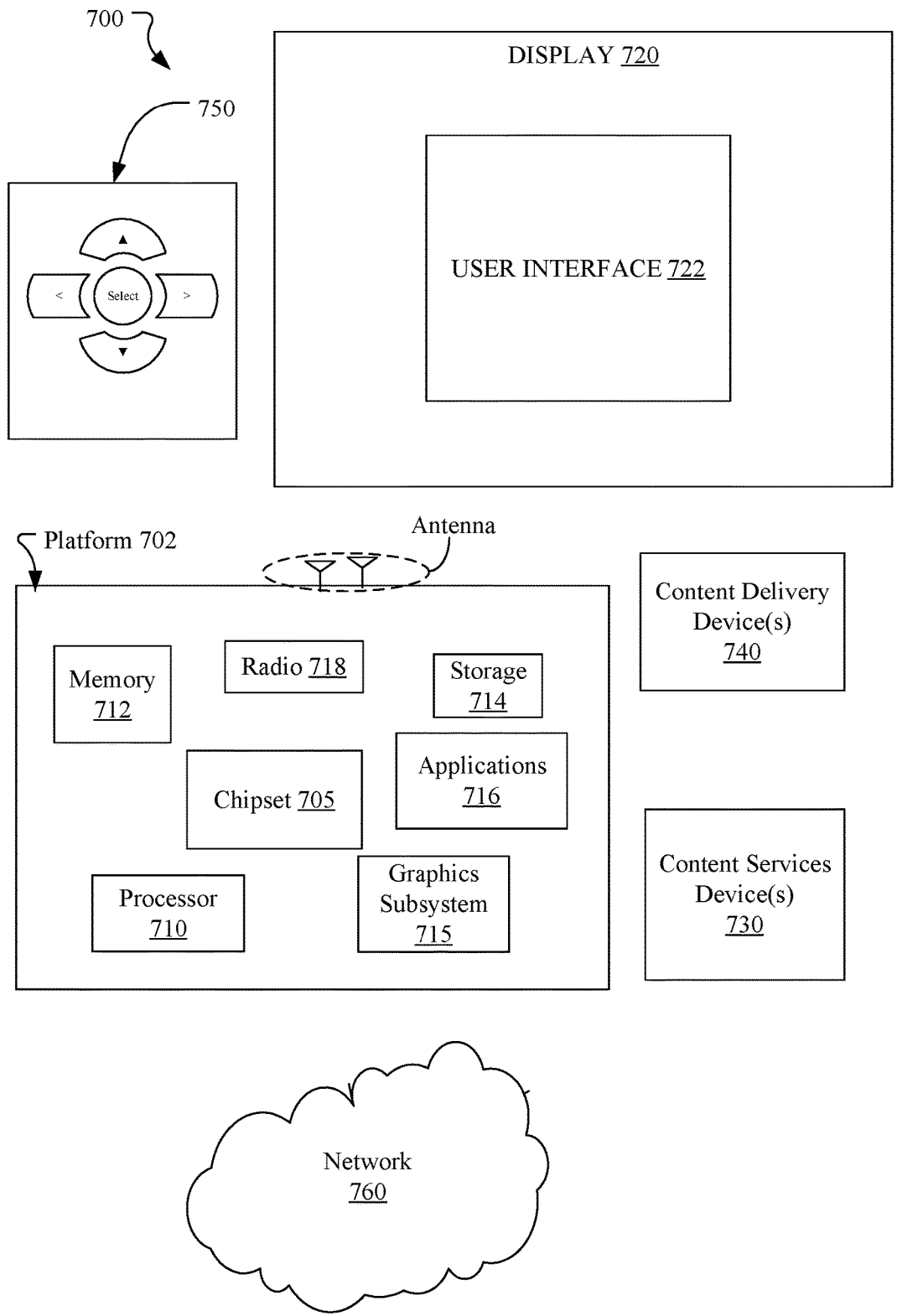
FIG. 11 is a block diagram of an example of a system having a navigation controller according to an embodiment.

FIG. 11 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface (HDMI), DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705. In one example, the graphics subsystem 715 includes a noise reduction subsystem as described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
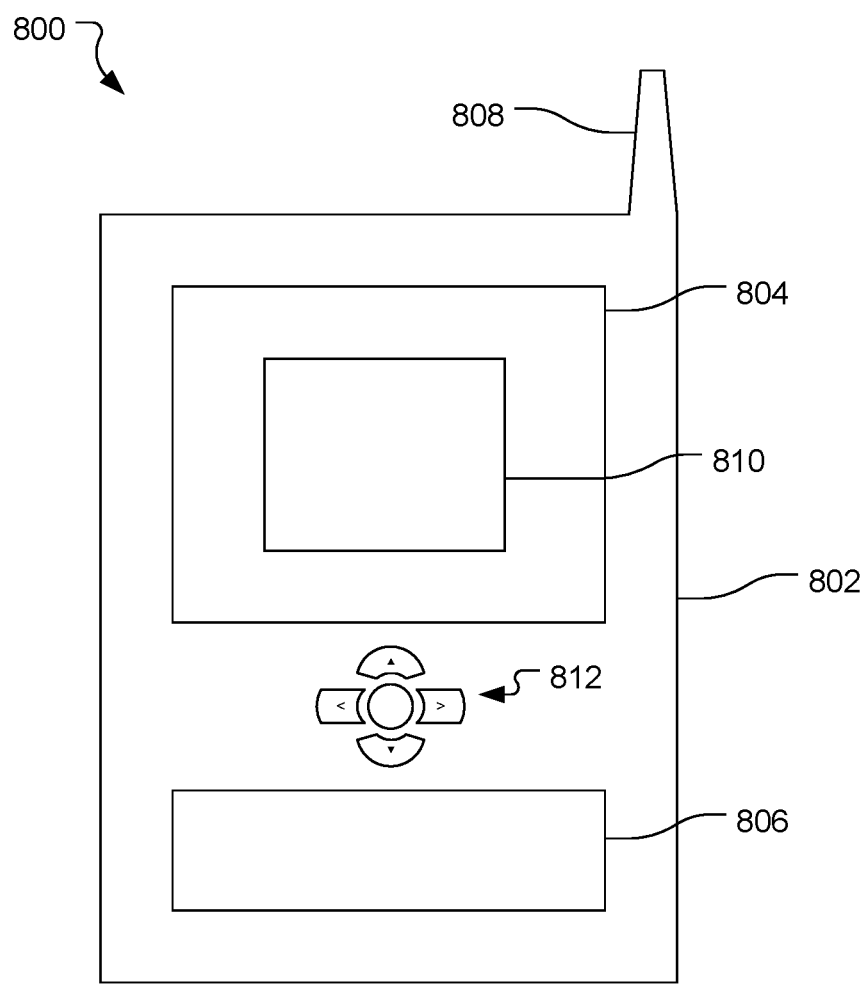
FIG. 12 is a block diagram of an example of a system having a small form factor according to an embodiment.

As described above, the system 700 may be embodied in varying physical styles or form factors. FIG. 12 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

In accordance with some embodiments, the system 700 and/or the small form factor device 800 may include or implement various aspects, components, or features of a contextual sound system/apparatus as described herein. For example, the memory 712 and/or the storage 714 may store a set of instructions which when executed by the processor 710 cause the system 700 to implement one or more of a sense engine, a sound identifier, a context identifier, an action identifier, a contextual sound filter, a context developer, ML elements, etc. as described herein. In particular, the system 700 and/or device 800 may implement or include one or more features from the following Additional Notes and Examples.

ADDITIONAL NOTES AND EXAMPLES

Example 1 may include an electronic processing system, comprising a processor, persistent storage media communicatively coupled to the processor, a sense engine communicatively coupled to the processor to provide sensed information, a sound identifier communicatively coupled to the sense engine to identify a sound based on the sensed information, a context identifier communicatively coupled to the sense engine to identify a context based on the sensed information, and an action identifier communicatively coupled to the sound identifier and the context identifier to identify an action based on the identified sound and the identified context.

Example 2 may include the system of Example 1, further comprising a contextual sound filter communicatively coupled to the context identifier to filter an audio signal based on one or more of the identified context and the identified action.

Example 3 may include the system of any of Examples 1 to 2, further comprising a context developer communicatively coupled to the context identifier to develop contextual information for the context identifier.

Example 4 may include a contextual sound apparatus, comprising a sound identifier to identify a sound, a context identifier to identify a context, and an action identifier communicatively coupled to the sound identifier and the context identifier to identify an action based on the identified sound and the identified context.

Example 5 may include the apparatus of Example 4, further comprising a sound monitor to actively listen for one or more sounds.

Example 6 may include the apparatus of Example 5, further comprising a contextual sound filter communicatively coupled to the context identifier to filter an audio signal based on one or more of the identified context and the identified action.

Example 7 may include the apparatus of Example 6, wherein the contextual sound filter is further to perform one or more of filter adjustment, filter block, and amplification of the identified sound based on one or more of the identified context and the identified action.

Example 8 may include the apparatus of any of Examples 4 to 7, further comprising a context developer communicatively coupled to the context identifier to develop contextual information for the context identifier.

Example 9 may include the apparatus of Example 8, wherein the context developer comprises a sound categorizer to categorize an unidentified sound as a newly identified sound, a response monitor to monitor a response to one or more of the identified sound and the newly identified sound, and a new action identifier to identify a new action based on the monitored response.

Example 10 may include the apparatus of Example 8, wherein the context developer comprises a machine learner to one or more of identify a sound, categorize a sound, and identify a new action based on one or more of the context and a monitored response.

Example 11 may include the apparatus of Example 4, wherein the action identifier is further to buffer the identified sound, analyze the buffered sound, and synchronize the buffered sound to real-time based on the analysis and the identified action.

Example 12 may include a method of identifying a sound-based action, comprising identifying a sound, identifying a context, and identifying an action based on the identified sound and the identified context.

Example 13 may include the method of Example 12, further comprising actively listening for one or more sounds.

Example 14 may include the method of Example 13, further comprising filtering an audio signal based on one or more of the identified context and the identified action.

Example 15 may include the method of Example 14, further comprising performing one or more of filter adjustment, filter block, and amplification of the identified sound based on one or more of the identified context and the identified action.

Example 16 may include the method of any of Examples 12 to 15, further comprising developing contextual information to identify the context.

Example 17 may include the method of Example 16, further comprising categorizing an unidentified sound as a newly identified sound, monitoring a response to one or more of the identified sound and the newly identified sound, and identifying a new action based on the monitored response.

Example 18 may include the method of Example 16, further comprising machine learning one or more of sound identification, sound categorization, and new action identification based on one or more of the context and a monitored response.

Example 19 may include the method of Example 12, further comprising buffering the identified sound, analyzing the buffered sound, and synchronizing the buffered sound to real-time based on the analysis and the identified action.

Example 20 may include at least one computer readable medium, comprising a set of instructions, which when executed by a computing device, cause the computing device to identify a sound, identify a context, and identify an action based on the identified sound and the identified context.

Example 21 may include the at least one computer readable medium of Example 20, comprising a further set of instructions, which when executed by a computing device, cause the computing device to actively listen for one or more sounds.

Example 22 may include the at least one computer readable medium of Example 21, comprising a further set of instructions, which when executed by a computing device, cause the computing device to filter an audio signal based on one or more of the identified context and the identified action.

Example 23 may include the at least one computer readable medium of Example 22, comprising a further set of instructions, which when executed by a computing device, cause the computing device to perform one or more of filter adjustment, filter block, and amplification of the identified sound based on one or more of the identified context and the identified action.

Example 24 may include the at least one computer readable medium of any of Examples 20 to 23, comprising a further set of instructions, which when executed by a computing device, cause the computing device to develop contextual information to identify the context.

Example 25 may include the at least one computer readable medium of Example 24, comprising a further set of instructions, which when executed by a computing device, cause the computing device to categorize an unidentified sound as a newly identified sound, monitor a response to one or more of the identified sound and the newly identified sound, and identify a new action based on the monitored response.

Example 26 may include the at least one computer readable medium of Example 24, comprising a further set of instructions, which when executed by a computing device, cause the computing device to machine learn one or more of sound identification, sound categorization, and new action identification based on one or more of the context and a monitored response.

Example 27 may include the at least one computer readable medium of Example 20, comprising a further set of instructions, which when executed by a computing device, cause the computing device to buffer the identified sound, analyze the buffered sound, and synchronize the buffered sound to real-time based on the analysis and the identified action.

Example 28 may include a contextual sound apparatus, comprising means for identifying a sound, means for identifying a context, and means for identifying an action based on the identified sound and the identified context.

Example 29 may include the apparatus of Example 28, further comprising means for actively listening for one or more sounds.

Example 30 may include the apparatus of Example 29, further comprising means for filtering an audio signal based on one or more of the identified context and the identified action.

Example 31 may include the apparatus of Example 30, further comprising means for performing one or more of filter adjustment, filter block, and amplification of the identified sound based on one or more of the identified context and the identified action.

Example 32 may include the apparatus of any of Examples 28 to 31, further comprising means for developing contextual information to identify the context.

Example 33 may include the apparatus of Example 32, further comprising means for categorizing an unidentified sound as a newly identified sound, means for monitoring a response to one or more of the identified sound and the newly identified sound, and means for identifying a new action based on the monitored response.

Example 34 may include the apparatus of Example 32, further comprising means for machine learning one or more of sound identification, sound categorization, and new action identification based on one or more of the context and a monitored response.

Example 35 may include the method of Example 28, further comprising means for buffering the identified sound, means for analyzing the buffered sound, and means for synchronizing the buffered sound to real-time based on the analysis and the identified action.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phase "one or more of A, B or C" may both mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
persistent storage media communicatively coupled to the processor;
a sense engine communicatively coupled to the processor to provide sensed information;
a sound identifier communicatively coupled to the sense engine to identify a sound based on the sensed information;
a context identifier communicatively coupled to the sense engine to identify a context based on the sensed information;
an action identifier communicatively coupled to the sound identifier and the context identifier to identify an action based on the identified sound and the identified context; and
a context developer communicatively coupled to the context identifier to develop contextual information for the context identifier,
wherein the contextual information is to be one or more of an emotional state of a user, biometric information of the user, gesture information of the user, or facial information of the user, and
wherein the context developer comprises a machine learner to identify a sound, categorize a sound, and identify a new action based on one or more of the context or a monitored response.

2. The system of claim 1, further comprising:
a contextual sound filter communicatively coupled to the context identifier to filter an audio signal based on one or more of the identified context and the identified action.

3. A contextual sound apparatus, comprising:
a sound identifier to identify a sound;
a context identifier to identify a context;
an action identifier communicatively coupled to the sound identifier and the context identifier to identify an action based on the identified sound and the identified context; and
a context developer communicatively coupled to the context identifier to automatically develop contextual information for the context identifier;
wherein the contextual information is to be one or more of an emotional state of a user, biometric information of the user, gesture information of the user, or facial information of the user,
wherein the context developer comprises a machine learner to identify a sound, categorize a sound, and identify a new action based on one or more of the context and a monitored response.

4. The apparatus of claim 3, further comprising:
a sound monitor to actively listen for one or more sounds.

5. The apparatus of claim 4, further comprising:
a contextual sound filter communicatively coupled to the context identifier to filter an audio signal based on one or more of the identified context and the identified action.

6. The apparatus of claim 5, wherein the contextual sound filter is further to perform one or more of filter adjustment, filter block, and amplification of the identified sound based on one or more of the identified context and the identified action.

7. The apparatus of claim 3, wherein the context developer comprises:
a sound categorizer to categorize an unidentified sound as a newly identified sound;
a response monitor to monitor a response to one or more of the identified sound and the newly identified sound; and
a new action identifier to identify a new action based on the monitored response.

8. A method of identifying a sound-based action, comprising:
identifying a sound;
identifying a context;
identifying an action based on the identified sound and the identified context;
developing contextual information to identify the context, and
machine learning sound identification, sound categorization, and new action identification based on one or more of the context and a monitored response,
wherein the contextual information is one or more of an emotional state of a user, biometric information of the user, gesture information of the user, or facial information of the user.

9. The method of claim 8, further comprising:
actively listening for one or more sounds.

10. The method of claim 9, further comprising:
filtering an audio signal based on one or more of the identified context and the identified action.

11. The method of claim 10, further comprising:
performing one or more of filter adjustment, filter block, and amplification of the identified sound based on one or more of the identified context and the identified action.

12. The method of claim 8, further comprising:
categorizing an unidentified sound as a newly identified sound;
monitoring a response to one or more of the identified sound and the newly identified sound; and
identifying a new action based on the monitored response.

13. The method of claim 8, further comprising:
buffering the identified sound;
analyzing the buffered sound; and
synchronizing the buffered sound to real-time based on the analysis and the identified action.

14. At least one non-transitory computer readable medium, comprising a set of instructions, which when executed by a computing device, cause the computing device to:
identify a sound;
identify a context;
identify an action based on the identified sound and the identified context;
develop contextual information to identify the context; and
machine learn sound identification, sound categorization, and new action identification based on one or more of the context and a monitored response,
wherein the contextual information is to be one or more of an emotional state of a user, biometric information of the user, gesture information of the user, or facial information of the user.

15. The at least one non-transitory computer readable medium of claim 14, comprising a further set of instructions, which when executed by a computing device, cause the computing device to:
actively listen for one or more sounds.

16. The at least one non-transitory computer readable medium of claim 15, comprising a further set of instructions, which when executed by a computing device, cause the computing device to:
filter an audio signal based on one or more of the identified context and the identified action.

17. The at least one non-transitory computer readable medium of claim 16, comprising a further set of instructions, which when executed by a computing device, cause the computing device to:
perform one or more of filter adjustment, filter block, and amplification of the identified sound based on one or more of the identified context and the identified action.

18. The at least one non-transitory computer readable medium of claim 14, comprising a further set of instructions, which when executed by a computing device, cause the computing device to:
categorize an unidentified sound as a newly identified sound;
monitor a response to one or more of the identified sound and the newly identified sound; and
identify a new action based on the monitored response.

19. An electronic processing system, comprising:
a processor;
persistent storage media communicatively coupled to the processor;
a sense engine communicatively coupled to the processor to provide sensed information;
a sound identifier communicatively coupled to the sense engine to identify a sound based on the sensed information;
a context identifier communicatively coupled to the sense engine to identify a context based on the sensed information;
an action identifier communicatively coupled to the sound identifier and the context identifier to identify an action based on the identified sound and the identified context, and
a context developer communicatively coupled to the context identifier to develop contextual information for the context identifier,
wherein the contextual information is to be determined based on one or more of a user device temperature or user device power, and
wherein the context developer comprises a machine learner to identify a sound, categorize a sound, and identify a new action based on one or more of the context or a monitored response.

* * * * *